United States Patent Office 3,235,759
Patented Feb. 15, 1966

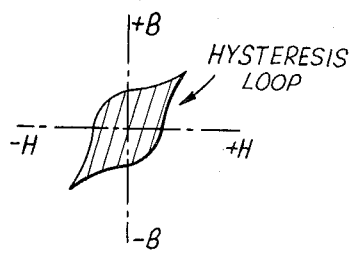
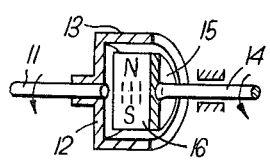
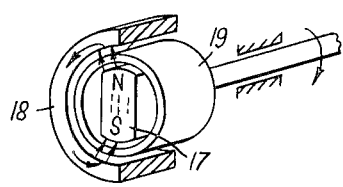
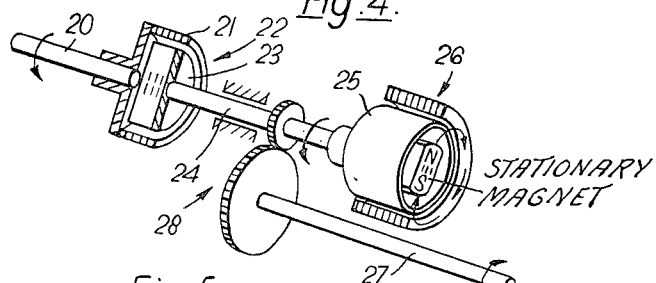
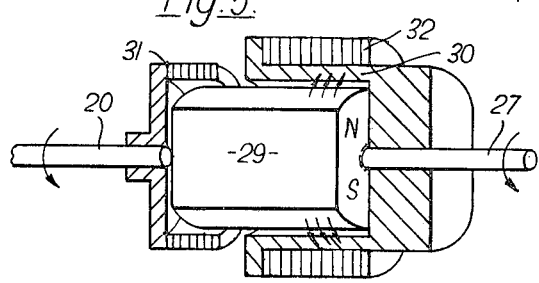

3,235,759
CONSTANT SPEED DRIVES
Stanley Bowie, Bramhall, England, assignor to A. V. Roe & Co. Limited, Middleton, England, a British company
Filed Oct. 30, 1961, Ser. No. 148,555
Claims priority, application Great Britain, Oct. 31, 1960, 37,408/60
8 Claims. (Cl. 310—103)

This invention relates to constant speed drives. Constant speed drives may be defined as devices which transmit torque from a source of torque to mechanisms to be operated or influenced, and which provide a more or less constant speed of rotation output from an input subject to variations in speed. It is an object of the invention to provide in a simple way a drive of this kind that is suitable for use in cases where the input speed is always greater than the output speed and the loads to be driven are very light and reasonably constant.

Accordingly to the present invention there is provided a rotary magnetic constant speed drive device wherein a variable drive input is applied through the intermediary of a magnetic hysteresis clutch to an eddy current drag damper, the damped output of the clutch affording the constant speed drive. In the preferred arrangement, a common permanent magnet is employed for both the clutch and the damper.

A better understanding of the nature of the invention will be had from the following description, given with reference to the accompanying drawings in which:

FIGURE 1 is a hysteresis loop diagram,
FIGURE 2 is a diagram of a hysteresis clutch,
FIGURE 3 is a diagram of an eddy current drag damper,
FIGURE 4 shows the clutch and damper of FIGURES 2 and 3 combined to form a constant speed drive device according to the invention, and
FIGURE 5 shows diagrammatically a constant speed drive unit in more practical form.

The principles involved may best be explained by first considering the hysteresis clutch and the eddy current drag device separately.

In a hysteresis clutch, a magnetic field rotates about a ring of magnetic material which has a large hysteresis loss per magnetic cycle, as represented by the area of the loop in FIGURE 1. The loop area is substantially independent of frequency and, since the hysteresis drag is proportional to the area of the hysteresis loop, the torque exerted on the ring is substantially independent of relative speed between the rotating field and the ring. This principle is used in hysteresis clutches to provide constant torque at the output shaft for varying input speeds.

One hysteresis clutch arrangement using a cylindrical permanent magnet to provide the field is shown in FIGURE 2. An input shaft 11 and an output shaft 14 are disposed in axial alignment, and the output shaft bears an end plate 15 on which is carried a permanent magnet 16 while the input shaft bears at its end a cup 12 the rim of which constitutes a hysteresis ring 13 surrounding the magnet. The poles of the magnet are diametrically disposed with respect to the common axis of the input and output shafts.

A typical eddy current drag damper is shown in FIGURE 3. A stationary permanent magnet 17 is surrounded by a stationary soft iron ring 18 to serve as a return path for flux, and an electrically conducting cup 19 coaxial with the ring 18 rotates in the air gap between the ring and the magnet. One of the characteristics of this type of drag damper is that below a certain critical speed the drag torque is closely proportional to the rotor speed.

A constant speed device according to the invention is shown diagrammatically in FIGURE 4. The input shaft 20 of the device drives the magnetic ring 21 of a hysteresis clutch 22 and the clutch magnet 23 rotates on a shaft 24 that is coupled to the rotating cup 25 of an eddy current drag damper 26. The output shaft 27 of the device is driven from the coupling shaft 24 through gearing 28.

The clutch 22 drives the damper 26 at constant torque and initially the damper speed rises until all this torque is absorbed by the damper (in the absence of external load), the speed of the coupling shaft 24 required to maintain these conditions then being constant. Since the device is intended for driving very small substantially constant loads the output speed achieves a stability dependent mainly on changes in electrical resistance of the damper cup 25 with temperature.

An example of a practical arrangement is shown in FIGURE 5. This embodies a common rotating magnet 29, for example of substantially cylindrical form, although this is not the only magnet configuration that can be employed. The magnet is diametrically magnetised, and is partially enclosed by a stationary damper or drag cup 30, the input clutch being formed by a hysteretic cup 31 surrounding the opposite end of the same magnet. The return flux path of the damper is provided by a ring 32 of laminated sheet to minimise eddy currents in this portion of the magnetic circuit. The stationary drag cup 30 may form part of the frame of the device but should preferably be made of a material which shows only small change in specific resistance with changing temperature, since the damping coefficient varies inversely as the resistance of the cup material and in consequence the output speed varies as the resistance of the cup material. The output shaft 27 is attached to the magnet and passes through an axial bore in the drag cup.

One advantage of the construction employing a common magnet is that it minimises output speed variations due to changing magnetomotive force of the magnet with aging or with change in temperature. Generally, the magnet flux falls with rising temperature, so tending to weaken the torque exerted on the magnet by the input cup. This would result in a proportional fall in the output shaft speed if the damping coefficient did not also fall due to the same weakening of the other end of the magnet. The use of a common magnet therefore gives improved stability of output speed as well as economy of construction and reduction of the magnetic leakage factor.

In the higher input speed ranges the hysteretic material forming the input clutch may with advantage be laminated in such a way as to minimise eddy currents which may form in the cup as it rotates. These eddy currents add to the clutch torque but are directly proportional to the relative speed between cup and magnet and therefore make the output speed rise and fall somewhat with input speed. For this reason eddy currents in the input cup must be kept to a minimum by suitable laminated design and by the choice of high electrical resistance materials.

Constant speed drives according to the invention find particular application in timing devices and for speed reference purposes.

I claim:

1. A rotary magnetic constant speed device for light loads comprising; a magnetic rotor having an input-output axis of the device passing endwise through it which rotor is rotatable about said axis and permanently magnetized diametrically with respect to said axis; a rotary hysteresis ring of magnetic material coaxial with said rotor and surrounding a first axial portion of said rotor at one end thereof; a variable speed drive shaft coaxial said rotor and connected to rotate said hysteresis ring; a stationary drag cup comprising a peripheral cup wall of electrically-conducting material and a cup end which cup is coaxial with said rotor and has its cup wall surrounding a different second axial portion of said rotor extending from the opposite end thereof, said cup end being disposed beyond and across said opposite end of said rotor, a stationary laminated ring coaxial with and encircling the peripheral wall of said drag cup which stationary ring is composed of a material to act as a return path for magnetic flux; and a constant speed output shaft coaxial with said rotor and connected to the end thereof remote from said input shaft and said hysteresis ring, which output shaft passes through an axial bore in said cup end.

2. A device as claimed in claim 1, wherein the hysteresis ring is of laminated construction.

3. A rotary magnetic constant speed device for light loads comprising; a magnetic rotor having an input-output axis of the device passing endwise through it which rotor is rotatable about said axis and permanently magnetized diametrically with respect to said axis; a rotary hysteresis ring of laminated magnetic material coaxial with said rotor and surrounding an axial portion at one end thereof; a variable speed drive shaft coaxial with said rotor and connected to rotate said hysteresis ring; a stationary drag cup comprising a peripheral cup and a cup end both of electrically-conducting material which cup is coaxial with said rotor and has its peripheral cup wall surrounding said rotor, while said cup end is disposed beyond and across one end of said rotor; a stationary laminated ring concentric with said peripheral cup wall and likewise encircling said rotor which stationary ring is composed of a material to act as a return path for magnetic flux; and a constant speed output member coaxial with and driven by said rotor.

4. A rotary magnetic constant speed device for light loads comprising; a magnetic rotor having an input-output axis of the device passing centrally through it which rotor is rotatable about said axis and is permanently magnetized diametrically with respect to said axis; a rotary hysteresis cup of magnetic material and coaxial with said rotor which hysteresis cup comprises a peripheral annulus portion of laminated construction and a plate at one end of said annulus portion, said annulus portion encircling a portion of the axial length of said rotor at one end thereof while said plate is substantially radial with respect to said axis and extends inward from said annulus portion across the axial projection of and beyond said one end of said rotor to form a flux path between poles induced in said annulus portion by said magnetized rotor; a variable speed drive shaft coaxial with said rotor and connected to rotate said hysteresis cup; a stationary drag cup coaxial with said rotor and of an electrically-conducting material with a small temperature coefficient of resistance which drag cup comprises a substantially cylindrical peripheral cup wall, a cup end wall at one end of said peripheral cup wall and an outwardly projecting radial cup rim at the opposite end of said peripheral cup wall, said peripheral cup wall encircling said rotor while said cup end wall extends radially inward from said peripheral cup wall across the axial projection of and beyond an end of said rotor; a stationary ring of laminated construction encircling peripheral cup wall and abutting said cup rim, said stationary ring being of a material to act as a return path for magnetic flux while said cup end wall and said cup rim act as return paths for eddy currents flowing axially in said peripheral cup wall across the lines of flux; and a constant speed output member coupled to said rotor at the end thereof remote from said drive shaft and said hysteresis cup.

5. A rotary magnetic constant speed device for light loads comprising; a magnetic rotor having an input-output axis of the device passing centrally through it which rotor is rotatable about said axis and is permanently magnetized diametrically with respect to said axis; a rotary hysteresis cup of magnetic material and coaxial with said rotor which hysteresis cup comprises a peripheral annulus portion encircling a portion of the axial length of said rotor at one end thereof; a variable speed drive shaft coaxial with said rotor and connected to rotate said hysteresis cup; a stationary drag cup coaxial with said rotor and of an electrically-conducting material which drag cup comprises a substantially cylindrical peripheral cup wall, a cup end wall at one end of said peripheral cup wall and an outwardly projecting radial cup rim at the opposite end of said peripheral cup wall, said peripheral cup wall encircling said rotor while said cup end wall extends radially inward from said peripheral cup wall across the axial projection of and beyond an end of said rotor; a stationary ring of laminated construction encircling said peripheral cup wall, said stationary ring being of a material to act as a return path for magnetic flux while said cup end wall and said cup rim act as return paths for eddy currents flowing axially in said peripheral cup wall across the lines of flux; and a constant speed output member coupled to said rotor at the end thereof remote from said drive shaft and said hysteresis cup.

6. A rotary magnetic constant speed device for light loads comprising; a magnetic rotor having an input-output axis of the device passing centrally through it which rotor is rotatable about said axis and is permanently magnetized diametrically with respect to said axis; a rotary hysteresis ring of magnetic material and coaxial with said rotor which hysteresis ring comprises a laminated annulus encircling said rotor at one end thereof; a variable speed drive shaft coaxial with said rotor and connected to rotate said hysteresis ring; a stationary drag cup coaxial with said rotor which drag cup comprises a substantially cylindrical peripheral cup wall, a cup end wall as one end of said peripheral cup wall and an outwardly projecting radial flange at the opposite end of said peripheral cup wall, said peripheral cup wall encircling said rotor, and said cup end wall and said cup flange acting as return paths for eddy currents flowing axially in said peripheral cup wall; and a constant speed output member coupled to said rotor at the end thereof remote from said drive shaft and said hysteresis ring.

7. A rotary magnetic constant speed device for light loads comprising; a magnetic rotor having an input-output axis of the device passing centrally through it which rotor is rotatable about said axis and is permanently magnetized diametrically with respect to said axis; a rotary hysteresis ring coaxial with and encircling said rotor; a variable speed drive shaft coaxial with said rotor and connected to rotate said hysteresis ring; a stationary drag cup coaxial with and encircling said rotor which drag cup comprises a peripheral cup wall and a radial cup rim at one end of said peripheral cup wall; a stationary ring of laminated construction encircling said peripheral cup wall to act as a return path for magnetic flux; and a constant speed output member coupled to said rotor at the end thereof remote from said drive shaft and said hysteresis ring.

8. A rotary magnetic constant speed device for light loads comprising; a magnetic rotor having an input-output axis of the device passing centrally through it which rotor is rotatable about said axis and is permanently magnetized diametrically with respect to said axis; a rotary hysteresis cup of magnetic material and coaxial with said rotor which hysteresis cup comprises a peripheral annulus portion of laminated construction and a plate at one end of said annulus portion, said annulus portion encircling a portion of the axial length of said rotor at one end thereof while said plate is substantially radial with respect to said axis and extends inward from said annulus portion across the axial projection of and beyond said one end of said rotor to form a flux path between poles induced in said annulus portion by said magnetized rotor; a variable speed drive shaft coaxial with said rotor and connected to rotate said hysteresis cup; a stationary drag cup coaxial with said rotor which drag cup comprises a peripheral cup wall encircling said rotor; a stationary ring of laminated construction encircling said peripheral cup wall said stationary ring being of a material to act as a return path for magnetic flux; and a constant speed output member coupled to said rotor at the end thereof remote from said drive shaft and said hysteresis cup.

References Cited by the Examiner

UNITED STATES PATENTS

| | | | |
|---|---|---|---|
| 2,293,784 | 8/1942 | Johnson | 310—93 |
| 2,603,678 | 7/1952 | Helmer | 310—103 |
| 2,807,734 | 9/1957 | Lehde | 310—103 |

FOREIGN PATENTS

| | | |
|---|---|---|
| 815,651 | 10/1951 | Germany. |
| 815,707 | 10/1951 | Germany. |
| 940,722 | 3/1956 | Germany. |

ORIS L. RADER, *Primary Examiner.*

DAVID X. SLINEY, MILTON O. HIRSHFIELD,
*Examiners.*